United States Patent

Galerne

[15] 3,647,350
[45] Mar. 7, 1972

[54] DITHIOCARBAZATES AND DITHIOCARBAMATES WITH ACID AND DIRECT DYES

[72] Inventor: Jean Galerne, Paris, France

[73] Assignee: Eugene-Gallia, Societe Anonyme, Paris, France

[22] Filed: Aug. 4, 1969

[21] Appl. No.: 847,436

[30] Foreign Application Priority Data

Aug. 28, 1968 France ..................... 164389

[52] U.S. Cl. ................................. 8/10, 8/40, 8/85, 8/172, 8/82
[51] Int. Cl. ................................................. D06p 3/00
[58] Field of Search .............. 8/10, 10.1, 10.2, 85, 54, 172, 8/82

[56] References Cited

UNITED STATES PATENTS

| | | | |
|---|---|---|---|
| 2,116,521 | 5/1938 | Kritchevsky | 8/10.1 |
| 3,246,004 | 4/1966 | Hall et al. | 260/314.5 |
| 3,363,972 | 1/1968 | Ulrich et al. | 8/54 |
| 3,418,063 | 12/1968 | Ulrich et al. | 8/85 |

*Primary Examiner*—Donald Levy
*Attorney*—Amster & Rothstein

[57] ABSTRACT

These dyes, notably for animal fibers, such as hair, wool, silk, and containing essentially acid or direct dyestuffs, comprise as adjuvants dithiocarbamic derivatives of formula:

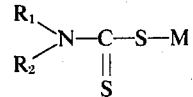

wherein M is $NH_4$, K or Na, and $R_1$ and $R_2$ identical or different represent each a hydrogen atom, a possibly substituted alkyl or phenyl, a $NR_3$ ($R_4$) group or a $N=CR_5$ ($R_6$) group, $R_1$ and $R_2$ being also able to form together and with the nitrogen atom to which they are linked a heterocycle. These adjuvants improve substantially the affinity of said dyestuffs for the fibres, consequently the intensity of the shade, as well as the uniformity of the dyeing.

2 Claims, No Drawings

DITHIOCARBAZATES AND DITHIOCARBAMATES WITH ACID AND DIRECT DYES

DYES NOTABLY FOR ANIMAL FIBERS

The present invention relates to dyes prepared from acid or direct dyestuffs.

According to the invention, these dyes are improved in that they comprise as adjuvants dithiocarbamic derivatives of formula:

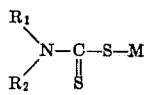

wherein M is $NH_4$, K or Na, and $R_1$ and $R_2$ are identical or different and represent each a hydrogen atom, a substituted or unsubstituted lower $C_1$ to $C_6$ alkyl, a substituted or unsubstituted phenyl, a $NR_3$ ($R_4$) group, wherein $R_3$ and $R_4$ are identical or different and represent each a hydrogen atom, a lower $C_1$ to $C_6$ alkyl, a phenyl, or form together and with the nitrogen atom to which they are linked a cycle, or an N=$CR_5$ ($R_6$) group wherein $R_5$ and $R_6$ are identical or different and represent each a hydrogen atom, a lower $C_1$ to $C_6$ alkyl, a phenyl, or form together a cycle, the aforesaid radicals $R_1$ and $R_2$ being also able to form together and with the nitrogen atom to which they are linked a cycle selected among the following ones:

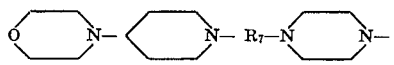

wherein $R_7$ is a lower $C_1$ to $C_6$ alkyl.

The substitutents of $R_1$ and $R_2$ may be or comprise a dithiocarbamic group.

After exhaustive research the applicant found that the presence of the above-defined dithiocarbamic derivatives as adjuvants in dyeing baths containing acid dyestuffs exerted a particularly favorable action. These dyeing baths used for coloring wool fibers in the form of tag wool, spun wool, fabric or any other form, have the property of dyeing these materials with considerably improved intensity and uniformity.

Comparative tests were actually performed on identical wool samples by utilizing the same dyeing bath compositions, the only difference residing in the presence, in one case, of one of the above-defined dithiocarbamic derivatives, the reference test being carried out under the same time, pH and temperature conditions with a bath without any dithiocarbamic derivatives.

The dyestuff affinity is improved very considerably: thus, it was observed that the amount of fixed dyestuffs was up to five times greater.

The improved dyestuffs according to this invention have also been utilized very successfully for dyeing keratinic fibers, notably human hair, the dyestuffs used in this case being either direct or acid dyestuffs. Thus, new hair dyes have been developed, notably for human hair. These products can be referred to as oxidation-free dyestuffs for bleached and nonbleached hair.

The addition of dithiocarbamic derivatives permits the use of direct and self-oxidizable dyestuffs warranting a maximum affinity and insuring a shade uniformity which is definitely better than that obtained with hitherto known dyes.

The dyes according to this invention have the following general composition, the percent values being given by weight for each ingredient:

0.05 percent to 0.3 percent of a conventional complexing agent for alkaline-earth ions and metallic ions in general, such as for instance ethylene-diaminotetracetic acid (sodium salt).

0.05 percent to 5 percent of a surface-active agent promoting the contact between the dye and the fiber to be dyed, such as, for instance, oxyethylenated castor oil or sodium laurylsulfate.

0.05 percent to about 5 percent of a dyestuff for instance, such as "PN" fast blue in powder form (C.I. No.: acid blue 50), and "JR Extra" thioacid orange (C.I. No. 15,510).

1 percent to 5 percent of a dithiocarbamic derivative as defined hereinabove, such as, for instance, K, Na or $NH_4$ salt of morpholine N-dithiocarbamic acid, potassium dithiocarbazate and potassium N, N-diethyl dithiocarbamate.

balance to 100 percent in the form of water or a mixture of water with ethyl or benzyl alcohol.

ammonia or lactic acid, q.s. (quantity sufficient) for obtaining a neutral medium (pH=7), or ammonia, q.s. sufficient for obtaining an alkaline medium (pH>7), as the dye may be neutral or alkaline according to the specific dyestuff utilized and the nature of the fiber to be dyed.

The dyes produced according to the present invention will thus contain from about 1 percent to about 5 percent of the dithiocarbamic derivative used as an adjuvant.

The dyes are prepared by simply mixing the various ingredients in the cold state, in any desired order, the solid components being dissolved without any difficulty in the liquid components.

Thus, according to this invention, organic derivatives comprising one or several dithiocarbamic groups in their molecule are added to the dyeing baths and the printing preparations generally employed for coloring wool in all possible forms thereof, and also silk.

These dithiocarbamic derivatives are also added to preparations used in capillary cosmetology for dyeing living hair. They are also suitable for use in all operations consisting in dyeing natural or synthetic hair in the wig-making art, in the manufacture of false hair, moustaches, etc.

Interesting results have also been achieved by adding these derivatives to baths intended for dyeing polyamids of all types, these baths containing the same acid dyestuffs as those utilized for dyeing wool.

The presence of dithiocarbamic derivatives permits, for a same final result, the use of more diluted dyeing baths, of dyestuffs which are known to have as a rule little or no affinity for animal fibers, and also of dyeing at a relatively low temperature if not at room temperature, a feature extremely advantageous in the case of certain fragile fibers, when a normal affinity is observed only at relatively high temperature.

The invention will now be illustrated by reference to the following examples which however should not be construed as limiting the scope of the invention.

Examples

Table I hereinafter shows dye formulations suitable for dyeing wool or silk or a polyamid such as "Nylon 6–6" (Solutions A and B), or for dyeing human hair (Solutions C and D).

The percentages are given by weight.

TABLE I

DYES

| | | |
|---|---|---|
| A- | Neutral dye solution | |
| Ethylene diamino-tetracetic acid (sodium salt) | | 0.1% |
| Oxyethylenated castor oil | | 2 % |
| Dyestuffs (1) | | 0.1% |
| Dithiocarbamic derivative (2) | | 3 % |
| Water | balance to | b 100 % |
| Ammonia or lactic acid | q.s. to obtain pH=7 | |

B- Alkaline dye solution

| | | |
|---|---|---|
| Ethylene diamino-tetracetic acid (sodium salt) | | 0,1% |
| Oxyethylenated castor oil | | 2 % |
| Dyestuffs (1) | | 0,1% |
| Dithiocarbamic derivative (2) | | 3 % |
| Water | balance to | 100 % |
| Ammonia | q.s. to obtain pH=9 | |

C- Dyeing of bleached hair

| | | |
|---|---|---|
| Ethylene diamino-tetracetic acid (sodium salt) | | 0,1% |
| Oxyethylenated castor oil | | 2 % |
| Dyestuffs (1) | | 0,1% |
| Dithiocarbamic derivative (2) | | 0,5% |
| Water | balance to | 100 % |
| Ammonia | q.s. to obtain pH=8 | |

D- Dyeing of natural hair

| | | |
|---|---|---|
| Ethylene diamino-tetracetic acid (sodium salt) | | 0,1% |
| Oxyethylenated castor oil | | 2 % |
| Dyestuffs (1) | | 0,1% |
| Dithiocarbamic derivative (2) | | 3 % |
| Ammonium thioglycolate | | 1,5% |
| Water | balance to | 100 % |
| Ammonia | q.s. to obtain pH=9 | |

9.S. = quantity sufficient (1) see Table II (2) see Table III.

With each bath the dyeing operations have been carried out
1. at 20° C.
2. at 50° C.
3. at 80° C., except for silk which would be deteriorated.
In all cases the dyeing time was 10 minutes.

TABLE II

DYESTUFFS

| Commercial Name | Color Index Number |
|---|---|
| Fast blue "Powder" | Acid blue 50 |
| Sulfacid orange "JR Extra" | 15 510 |
| Sulfacid bright pink "3B" | 45 100 |
| Sulfacid yellow "7 J" | 47 035 |
| Sulfacid bright blue "7 J" | 42 080 |
| Sulfacid bright blue "2R 1150" | 42 571 |
| Supracid black "Lumiere RL" | 17 580 |
| Acetacid red "R" | 14 720 |
| Coriacid deep brown* | |

*o-sulfonated p-amino-o-diphenylamine combined with the reaction product of resorcine with p-nitroaniline, the whole combined with the mixture sulfonic nitroaminophenol-picramic acid (50 percent:50 percent by weight).

| Chemical name | Formula |
|---|---|
| Potassium N,N-dimethyl dithiocarbamate. | $CH_3 \diagdown N-C-SK \atop CH_3 \diagup \phantom{N-}\overset{\|}{\underset{S}{}}$ |
| Potassium N,N-diethyl dithiocarbamate. | $CH_3CH_2 \diagdown N-C-SK \atop CH_3CH_2 \diagup \phantom{N-}\overset{\|}{\underset{S}{}}$ |
| Potassium N,N-di-(n-amyl)-dithiocarbamate. | $CH_3-(CH_2)_4 \diagdown N-C-SK \atop CH_3-(CH_2)_4 \diagup \phantom{N-}\overset{\|}{\underset{S}{}}$ |
| Potassium dithiocarbazate. | $H_2N-NH-C-SK \atop \phantom{H_2N-NH-}\overset{\|}{\underset{S}{}}$ |
| Potassium morpholine N-dithiocarboxylate. | $O\diagdown\bigcirc\diagup N-C-SK$ with $\|S$ |
| Potassium phenyldithiocarbamate. | phenyl$-NH-C-SK$, $\|S$ |
| Potassium piperidine N-dithiocarboxylate. | piperidine$-N-C-SK$, $\|S$ |
| Potassium 4-hydroxyphenyl dithiocarbamate.[a] | $HO-$phenyl$-NH-C-SK$, $\|S$ |
| Potassium 4-sulfophenyl dithiocarbamate. | $HO_3S-$phenyl$-NH-C-SK$, $\|S$ |
| Sodium isopropylidene-3 dithiocarbazate. | $CH_3\diagdown C=N-NH-C-SNa \atop CH_3\diagup$, $\|S$ |
| Potassium cyclohexylidene-3 dithiocarbazate. | cyclohexylidene$=N-NH-C-SK$, $\|S$ |
| Ammonium cyclopentylidene-3 dithiocarbazate. | cyclopentylidene$=N-NH-C-SNH_4$, $\|S$ |
| Potassium dimethyl-3,3 dithiocarbazate. | $CH_3\diagdown N-NH-C-SK \atop CH_3\diagup$, $\|S$ |
| Potassium methyl-3 dithiocarbazate. | $CH_3-NH-NH-C-SK$, $\|S$ |
| Potassium n-butyl-3 dithiocarbazate. | $CH_3-CH_2-CH_2-CH_2-NH-NH-C-SK$, $\|S$ |
| Sodium phenyl-3 dithiocarbazate. | phenyl$-NH-NH-C-SNa$, $\|S$ |
| Sodium phenyl-3 methyl-3 dithiocarbazate. | phenyl$-N-NH-C-SNa \atop \phantom{xx}CH_3$, $\|S$ |
| Potassium N-[di-(β-hydroxyethyl)]-dithiocarbamate. | $HO-CH_2-CH_2\diagdown N-C-SK \atop HO-CH_2-CH_2\diagup$, $\|S$ |
| Ammonium N'-methyl piperazine N-dithiocarboxylate. | $CH_3-N\bigcirc N-C-SNH_4$, $\|S$ |
| Potassium N'-isopropyl piperazine N-dithiocarboxylate. | $CH_3\diagdown CH-N\bigcirc N-C-SK \atop CH_3\diagup$, $\|S$ |
| Potassium cyclopentamethylene-3,3 dithiocarbazate. | cyclopentamethylene$\diagdown N-NH-C-SK$, $\|S$ |
| Potassium benzylidene-3 dithiocarbazate. | phenyl$-CH=N-NH-C-SK$, $\|S$ |

[a] It was not possible to utilize potassium 4-hydroxyphenyl dithiocarbamate in a neutral medium due to the insolubility in these conditions.

What I claim is:

1. A dye composition which contains acid or direct dyestuffs and an adjuvant comprising a composition of the formula

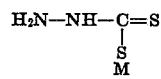

or a dithiocarbamic derivative of the formula wherein M is selected from the group consisting of $NH_4$, K or Na, and $R_1$ and $R_2$ are selected from the group consisting of a hydrogen atom, a lower alkyl group having one to six carbon atoms, a hydroxy-substituted lower alkyl group containing one to six carbon atoms, a phenyl group, a hydroxy phenyl group, a phenyl sulfonic acid group, wherein only one of $R_1$ and $R_2$ is a hydrogen atom a $NR_3$ ($R_4$) group wherein $R_3$ and $R_4$ are selected from the group consisting of a hydrogen atom, a lower alkyl group having one to six carbon atoms, a phenyl group or form together a cyclic radical a $N = C R_5$ ($R_6$) group wherein $R_5$ and $R_6$ are selected from the group consisting of a lower alkyl group having one to six carbon atoms, and a phenyl group, or $R_1$ and $R_2$ form a cyclic radical together with the nitrogen atom to which they are linked said radical being selected from the group consisting of

wherein $R_7$ is lower alkyl group having one to six carbon atoms.

2. According to claim 1, enclosing said dithiocarbamic derivatives in an amount ranging from about 1 percent to about 5 percent by weight.

* * * * *